W. LANGDON-DAVIES.
ELECTRICALLY CONTROLLED CLUTCH.
APPLICATION FILED MAY 5, 1917.

1,305,612.

Patented June 3, 1919.

Inventor:
Walter Langdon-Davies
by Foster, Freeman, Watson & Coit
Attys

UNITED STATES PATENT OFFICE.

WALTER LANGDON-DAVIES, OF WEYBRIDGE, ENGLAND.

ELECTRICALLY-CONTROLLED CLUTCH.

1,305,612.  Specification of Letters Patent.  Patented June 3, 1919.

Application filed May 5, 1917. Serial No. 166,701.

*To all whom it may concern:*

Be it known that I, WALTER LANGDON-DAVIES, subject of the King of England, residing at Weybridge, Surrey, in England, have invented certain new and useful Improvements in Electrically-Controlled Clutches, of which the following is a specification.

This invention relates to electrically controlled clutches and has particular reference to clutches which are used between an electric motor and a shaft driven from it, such driven shaft being used to transmit power to any mechanism mechanical or electrical.

The invention is primarily concerned with an electro-magnetic clutch of the kind which is provided with two, or sometimes three, coils one of which, when energized, acts to cause driving pressure between the clutch members, and another to oppose the action of the first coil and tend to cause slip to take place between the clutch members.

According to this invention the opposing coil, that is to say, the coil which controls the slip of the clutch, is connected in circuit with the armature of the driving electric motor. Thus if the load is thrown on suddenly and a heavy current passes through the motor armature that current, or a current proportional to it, passing through the opposing coil of the clutch will cause slip to take place between the clutch members, such slip continuing in diminishing degree while the load is being accelerated.

Preferably the clutch is provided with a third or supplementary coil energized by a current which varies with the voltage of a dynamo driven from the slipping side of the clutch. This dynamo may be used to provide electrical power for work in an outside circuit or it may merely be a small exciter for the purpose of energizing the third coil. The direction of current in the third or supplementary coil is preferably such that the effect of the coil is to help the opposing coil.

The power transmitted by the shaft driven through the clutch may be applied for any purpose and when the shaft is used to drive electrical machinery a generator may be employed having an armature or rotor provided with slip rings and also with a commutator. Both continuous and alternating current can then be obtained from the generator and applied to any purpose in suitable circuits. The continuous current part of the machine may, however, be so designed as merely to fulfil the function of an exciter for the third or supplementary coil of the clutch when such is provided.

With this arrangement the power taken from the generator can be controlled by the clutch so that it does not exceed a predetermined maximum, slip taking place when that maximum is reached.

Figure 1:
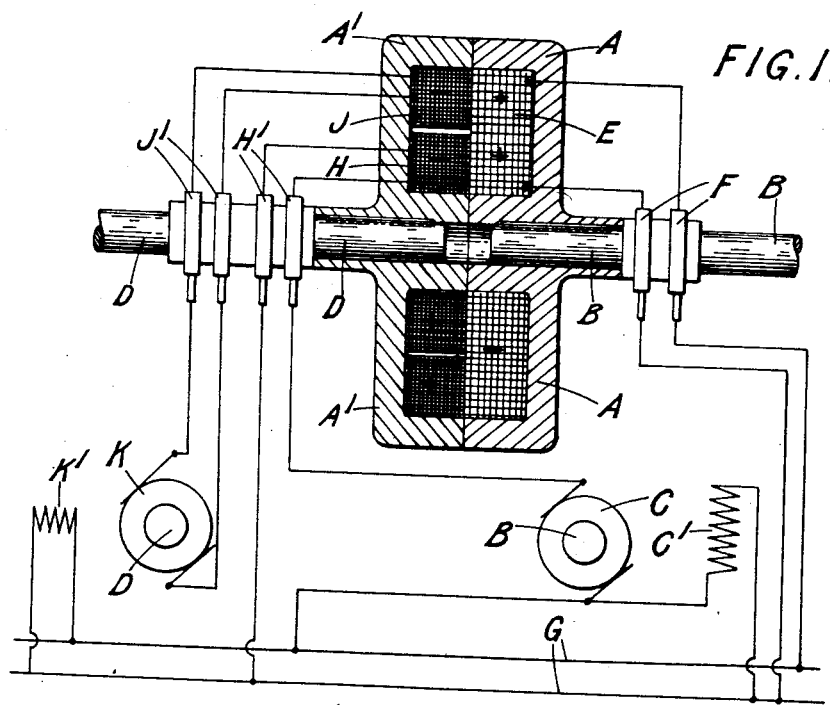
Figure 1 is a diagram illustrating one arrangement of an electro-magnetic clutch constructed in accordance with this invention.

With reference first to Fig. 1 the clutch comprises two members A and A' the member A being keyed to a shaft B driven by an electric motor C and the member A' being keyed to a shaft D which may drive the road wheels of a vehicle or do any other form of work. The clutch member A is provided with a coil E energized through slip rings F from mains G connected to some source of constant voltage. This coil E is the exciting coil for the clutch its function being to produce driving pressure between the clutch members A and A'.

The member A' is provided with two coils H and J connected respectively to slip rings H' and J'. The coil H is connected in series with the armature of the motor C the connections being such that the magnetic effect of the coil, when energized, opposes that of the exciting coil E.

The third or supplementary coil J is energized by a current depending on the voltage of a dynamo K driven by the shaft D and the connections of the coil J are such that its effect is to assist the opposing coil H.

The direction of the current passing through each of the coils E H and J is indicated by the conventional positive and negative symbols shown on the drawings.

In the example shown the field magnet coil K' of the dynamo K and the field magnet coil C' of the motor C are connected across the mains G, but it is to be understood that any known system of excitation for those two machines may be employed.

The dynamo K may be quite small and simply serve as an exciter for the supplementary coil J or, on the other hand, it may be a large machine and current may be taken from it for any other purpose as well as for exciting the coil J. Thus, according to the circumstances in which the clutch is employed, the dynamo K might take only a small fraction of the power transmitted by the clutch or it may take practically all that power.

As the opposing coil is in series with the armature of the motor C, when the load is thrown on a large current will pass through the opposing coil H and a considerable amount of slip will take place. This will diminish as the motor picks up its load and the back E. M. F. of the motor reduces the current in the armature and in the opposing coil. As the third or supplementary coil J is arranged to assist the opposing coil H the process of taking up the load will be still more smooth and gradual as the growing voltage of the dynamo K will tend to cause further slip to take place. When running normally on full load it is obvious that any increase of load will tend to cause slip to take place owing to the increase of current through the motor armature and consequently through the opposing coil H.

Figure 2:
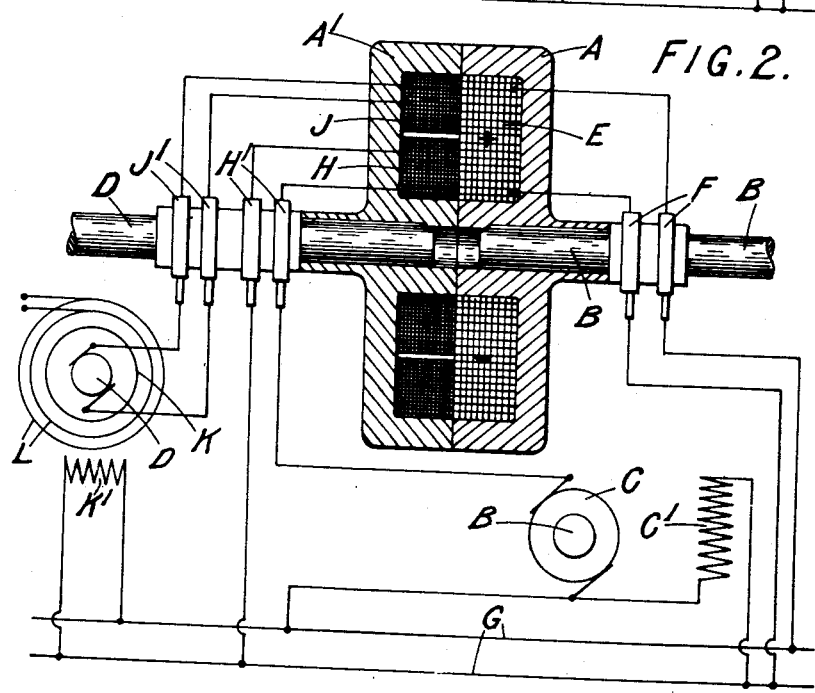
Fig. 2 is a similar diagram but showing the clutch employed to do electrical work in an alternating current circuit.

The arrangement shown in Fig. 2 is similar to that illustrated in Fig. 1 except that the shaft D is shown as driving an alternate current generator L as well as the dynamo or continuous current generator K. This may be taken as an example of the power transmitted through the clutch being employed to do electrical work in an alternating current circuit but, as in the example shown in Fig. 1, the continuous current generator K may give some power to an outside circuit as well as serve to excite the third or supplementary coil J. Further, it may furnish the current for the excitation of the alternator L or alternatively the current for that excitation may be obtained from the mains G.

The alternator L and dynamo K may be separate machines or a generator may be employed having an armature or rotor furnished with slip rings and also with a commutator so that both continuous and alternating current can be obtained from the one generator.

The clutch illustrated is of the electromagnetic type having no variable air-gap, that is to say, having constant reluctance, but other known types of electromagnetic clutches may be employed. Again, the invention may be applied to electrically controlled clutches of the type in which the driving pressure is produced mechanically, say, by the action of a spring, the force exerted by the spring being opposed or controlled by the opposing and supplementary coils.

What I claim as my invention and desire to secure by Letters Patent is:—

1. The combination with an electric motor, of an electrically controlled clutch driven by the motor and having a coil which is in circuit with the motor armature and tends to produce slip between the clutch members.

2. The combination of an electric motor, an electrically controlled clutch driven by said motor, and a coil energized by a current equal or proportional to the current in the armature circuit of the motor and tending to produce slip between the clutch members.

3. The combination of an electric motor, an electrically controlled clutch driven by said motor, a dynamo driven through the clutch, a coil energized by a current equal or proportional to the current in the armature circuit of the motor and tending to produce slip between the clutch members, and another coil also acting on the clutch and energized by a current varying with the voltage of the driven dynamo.

4. The combination of an electric motor, an electromagnetic friction clutch driven by the motor, and two coils acting upon the magnetic circuit of the clutch, one coil being energized from a source of constant voltage and acting to produce driving pressure between the clutch members and the other coil, opposing the first coil, being energized by a current equal or proportional to the current in the armature circuit of the driving motor.

5. The combination of an electric motor, an electromagnetic friction clutch driven by the motor, a dynamo driven through the clutch, and three coils acting upon the magnetic circuit of the clutch, the first coil being energized from a source of constant voltage and acting to produce driving pressure between the clutch members, the second coil opposing the first coil and being energized by a current equal or proportional to the current in the armature circuit of the driving motor and the third coil being energized by a current varying with the voltage of a dynamo driven through the clutch.

6. The combination of an electric motor, an electrically controlled clutch driven by said motor, an alternate current generator driven through the clutch, a continuous current generator also driven through the clutch, a coil energized by a current equal or proportional to the current in the armature circuit of the driving motor and tending to produce slip between the clutch members and another coil also acting on the clutch and energized by a current varying with the voltage of the driven continuous current generator.

7. The combination of an electric motor, an electromagnetic friction clutch driven by the motor, an alternate current generator driven through the clutch, a continuous current generator also driven through the clutch, and three coils acting upon the magnetic circuit of the clutch the first coil being energized from a source of constant voltage and acting to produce driving pressure between the clutch members, the second coil opposing the first coil and being energized by a current equal or proportional to the current in the armature circuit of the driving motor and the third coil being energized by a current varying with the voltage of the driven continuous current generator.

In testimony whereof I have signed my name to this specification in the presence of two subscribing witnesses.

WALTER LANGDON-DAVIES.

Witnesses:
ARCHIBALD JOHN FRENCH,
WINIFRED SMITH.